United States Patent
Swatek et al.

(10) Patent No.: US 9,590,558 B2
(45) Date of Patent: Mar. 7, 2017

(54) SOLAR MODULE

(71) Applicants: Alexander Swatek, Gussing (AT);
Elmar Stoger, Bad Erlach (AT);
Michael Hoffmann, Gussing (AT);
Peter Matisovits, St. Michael (AT)

(72) Inventors: Alexander Swatek, Gussing (AT);
Elmar Stoger, Bad Erlach (AT);
Michael Hoffmann, Gussing (AT);
Peter Matisovits, St. Michael (AT)

(73) Assignee: Smart Flower Energy Technology GmbH, Gussing (AT)

( * ) Notice: Subject to any disclaimer, the term of this patent is extended or adjusted under 35 U.S.C. 154(b) by 138 days.

(21) Appl. No.: 14/390,070

(22) PCT Filed: Mar. 6, 2013

(86) PCT No.: PCT/AT2013/050058
§ 371 (c)(1),
(2) Date: Oct. 2, 2014

(87) PCT Pub. No.: WO2013/149278
PCT Pub. Date: Oct. 10, 2013

(65) Prior Publication Data
US 2015/0059825 A1    Mar. 5, 2015

(30) Foreign Application Priority Data
Apr. 2, 2012    (AT) .............................. A 50120/2012

(51) Int. Cl.
*H02S 30/20*    (2014.01)
*F24J 2/36*     (2006.01)
*F24J 2/54*     (2006.01)

(52) U.S. Cl.
CPC ................. *H02S 30/20* (2014.12); *F24J 2/36* (2013.01); *F24J 2/5406* (2013.01); *Y02E 10/47* (2013.01)

(58) Field of Classification Search
CPC .. F24J 2/5406; F24J 2/36; H02S 30/20; Y02E 10/47
(Continued)

(56) References Cited

U.S. PATENT DOCUMENTS 4,630,791 A * 12/1986 Chapman ................. B64G 1/14
                                                    136/245
4,747,567 A *  5/1988 Johnson ................. B64G 1/222
                                                    136/245
(Continued)

FOREIGN PATENT DOCUMENTS

AT        509886       12/2011
CN       86208862       3/1988
(Continued)

OTHER PUBLICATIONS

English translation of International Preliminary Report on Patentability for PCT/AT2013/050058.
(Continued)

*Primary Examiner* — Devina Pillay
(74) *Attorney, Agent, or Firm* — Hoffmann & Baron, LLP (57) ABSTRACT

A solar module comprising at least a plurality of lamellar solar panels, which are mounted pivotably, about a common axis, on an elongate support and can be and which can be moved between a first position, in which they are disposed on top of each other substantially congruently and parallel to the support, and a second position, in which they lie substantially next to each other in a fanned out manner about the aforementioned axis, wherein the support can be pivoted out of a housing, which accommodates the support together with
(Continued)

the solar panels in the first position of the panels, characterized in that the solar module comprises two supports of the aforementioned type equipped with solar panels in the manner described, wherein the two supports are pivotably hinged at the diametrical longitudinal ends of an elongate base support, which is mounted rotatably, about an approximately vertical axis, in the housing.

26 Claims, 5 Drawing Sheets

(58) Field of Classification Search
    USPC .......................................................... 136/245
    See application file for complete search history.

(56) References Cited

U.S. PATENT DOCUMENTS

| | | | |
|---|---|---|---|
| 5,228,664 A * | 7/1993 | Moulinet | F16C 7/04 248/632 |
| 5,578,139 A * | 11/1996 | Jones | B64G 1/44 136/245 |
| 8,664,511 B2 | 3/2014 | Swatek et al. | |
| 2010/0206354 A1 | 8/2010 | Greene, Jr. et al. | |
| 2011/0315192 A1* | 12/2011 | Swatek | H02S 30/20 136/245 |

FOREIGN PATENT DOCUMENTS

| | | |
|---|---|---|
| CN | 201194230 | 2/2009 |
| CN | 101383568 | 3/2009 |
| CN | 202039614 | 11/2011 |
| DE | 102009022610 | 5/2009 |
| TW | M 416206 | 11/2011 |
| WO | WO 9621250 | 7/1996 |

OTHER PUBLICATIONS

Republic of China First Office Action with English translation dated Dec. 2, 2015.
Republic of China Second Office Action with English translation dated Jul. 20, 2016.
Austrian Office Action for A 50120/2012 (Priority Application).
International Patentability Report for PCT/AT2013/050058.

* cited by examiner

Fig. 10

SOLAR MODULE

CROSS-REFERENCE TO RELATED APPLICATIONS

This application is a National Phase application of International Application No. PCT/AT2013/050058 filed Mar. 6, 2013 which claims priority to Austrian Utility Patent Application No. A 50120/2012 filed Apr. 2, 2012, the disclosures of which are incorporated herein by reference.

BACKGROUND

The present invention relates to a solar module comprising at least a plurality of lamellar solar panels which are mounted pivotably, about a common axis, on an elongate support and can be moved between a first position, in which they are disposed over each other substantially congruently and parallel to the support, and a second position, in which they lie substantially next to each other in a fanned out manner about the aforementioned axis, wherein the support can be pivoted out of a housing which accommodates the support together with the solar panels in the first position of the panels.

Such a solar module is known from AT 509 886 or WO 2012/000004 and comprises an installable housing, from which a support comprising a solar panel fan can be extended. The known solar panel is particularly suited for stationary use.

SUMMARY

It is the object of the invention to improve a solar module of this type specifically for transport and temporary use in changing usage locations.

This object is achieved by a solar module of the type mentioned at the outset, which according to the invention is characterized in that the solar module comprises two supports of the aforementioned type equipped with solar panels in the aforementioned manner, wherein the two supports are pivotably hinged at the diametrical longitudinal ends of an elongate base support which is mounted rotatably, about an approximately vertical axis, in the housing.

In this way, optimal space utilization of the housing in the closed state of the solar module (solar panels in the first position, all supports pivoted in) as well as a maximal sunlight collection surface in the opened state (solar panels in the second position, all supports pivoted out) are achieved. In the opened position, the rotatable base support ensures that the fanned-out solar panels are oriented toward the sun and the entire surface of the panels can be exposed to the sun, without the two solar panel fans creating shadowing for each other. In the closed position, the solar module according to the invention is suited in particular for containerization for transport due to the optimized space requirement of the module.

In a preferred embodiment of the invention, the housing is thus a standardized land, sea or air freight container, and more particularly an ISO container or an EN (Eurocode) swap body. In this way, the solar module can be transported easily and quickly to temporary usage locations by way of standardized means of transportation for the autonomous power supply of equipment, for example of research facilities in remote geographical regions, electronic systems during events, or military equipment in the field.

According to a particularly advantageous embodiment of the invention, each support is located approximately parallel to the base support when in the pivoted-in position, and at an obtuse angle relative to the base support, preferably approximately 120°, when in the pivoted-out position. This maximizes the size of the solar panels, without creating mutual shadowing.

In the pivoted-in position, the two supports are preferably located symmetrically with respect to the rotational axis of the base support, whereby cantilever and wind loads can be balanced in the opened state, and thereby minimized.

According to a preferred variant of the invention, the housing has the shape of an elongate box having a cover side that can be opened and at least two longitudinal sides that can be opened, which when open permit the base support to be rotated with respect to the remaining housing. In an alternative preferred variant, the housing has the shape of an elongate box and is divided into a lower part and an upper part, wherein the lower part accommodates the pivot mounting for the base support and the upper part accommodates the base support, so as to permit the upper part and the base support to be rotated jointly with respect to the lower part. Both variants create excellent protection for the solar panels in the closed state, and full freedom of movement of the panels in the opened state of the solar module.

According to a further preferred feature of the invention, the lower part of the housing can include at least one electric accumulator for power generated by the solar panels. This results in a low center of gravity of the solar module, which is particularly advantageous for absorbing cantilever and wind loads in the opened state.

According to a further advantageous embodiment of the invention, at least one solar panel is equipped at the rear with a sweeping lip, which slides along the solar panel located beneath during fanning out, as is known per se from WO 2012/000004. This basically creates a self-cleaning solar module: During fanning out—and also during the opposite movement—the sweeping lip of the one solar panel cleans dust, snow, rain, leaves and the like off the surface of the adjoining solar panel, so that optimal performance capability of the solar panels is maintained, even with changing weather conditions and over the entire course of the year.

In any case, it is particularly favorable if each support comprises a pivot head at one end for mounting the solar panels. The solar panels can thus be oriented toward the sun even better in the fanned-out second position. The base support and/or the two supports and/or the pivot heads, if such are present, are preferably equipped with a drive controlled as a function of the position of the sun for automatic solar tracking of the solar panels, so as to always achieve optimal efficiency over the course of the day and year.

The solar panels, the supports thereof, and the base support could essentially be pivoted, fanned out and folded, and rotated by hand. It is particularly advantageous if the solar panels, supports and base support can be moved between the positions thereof by way of electric drives, so that the operation of the solar module can be automated. The solar panels can thus be automatically extended and fanned out, for example when there is sufficient sunlight and stable weather conditions, and they can be automatically folded and the housing can be closed at dark or during poor weather conditions.

The solar panels can essentially take on any arbitrary type known in technology which permits solar light to be converted into usable energy, for example by way of heat transfer fluids circulating in the solar panels, which are heated by the sunlight. Each solar panel is preferably formed by a planar array of photovoltaic solar cells so as to directly generate electric power. This also facilitates the interconnection of solar panels among each other and the connection of the same to the support or to the pivot head, because here only electrical connections have to be established.

BRIEF DESCRIPTION OF THE DRAWINGS

The invention will be described hereafter in greater detail based on exemplary embodiments shown in the accompanying drawings. In the drawings.

DETAILED DESCRIPTION

According to FIGS. 1 to 7, a solar module 1 comprises a housing 2 having an approximately parallelepiped shape, which is to say a box shape. The housing 2 can be made of any arbitrary material, such as wood or plastic material; the housing is preferably made of metal, and more particularly steel. In one exemplary embodiment, the housing 2 is a standardized freight container for land, sea or air transport, such as an ISO container measuring 20 feet in length ("Twenty-Foot Equivalent Unit," TEU) or 40 feet in length ("Forty-Foot Equivalent Unit," FEU) for transport by rail, ship or truck; or a Eurocode (EN) swap body for transport by truck; a semitrailer for semitrailer tractors; an ICAO airfreight container for transport by air; or the like.

In the example shown, the housing 2 has been modified compared to a standardized ISO container to the extent that it is divided into a lower part 4 and an upper part 5 along an approximately horizontal dividing plane 3, the parts being rotatable relative to each other about an approximately vertical axis 6 (FIG. 4), as will be described in more detail hereafter. Moreover, at least the cover side 7 of the housing 2 can be opened, either by removing, folding open or pushing away a cover (not shown) or, as is shown, by folding open four flaps 8.

Figure 4:
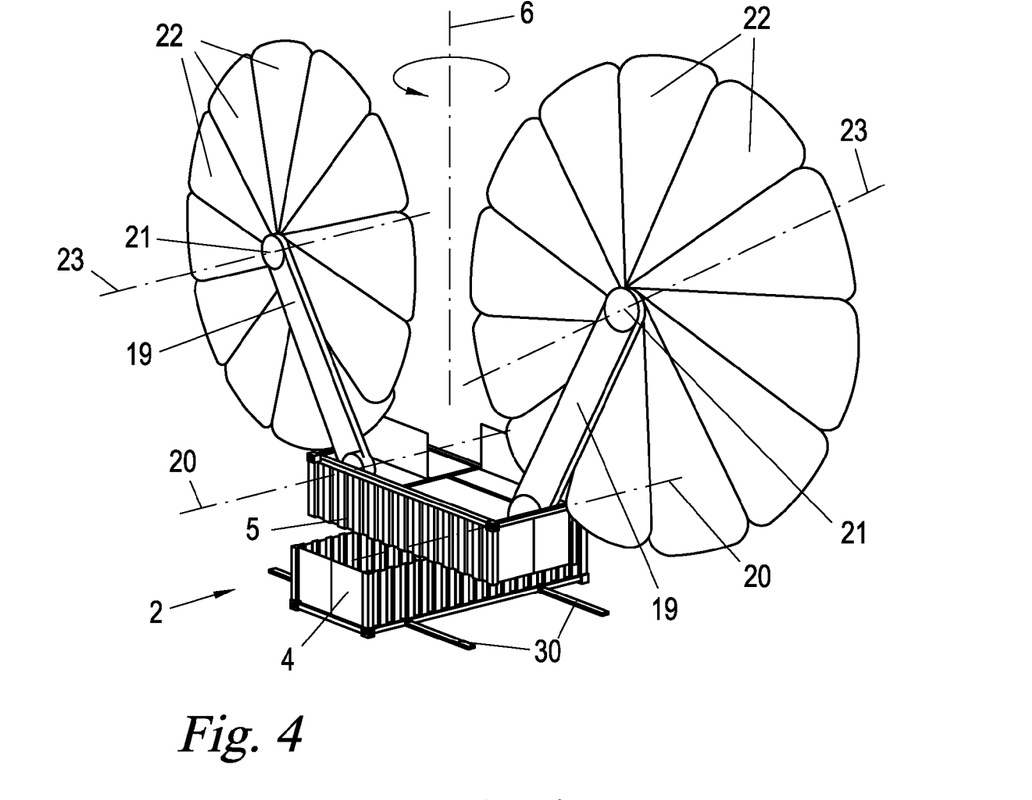
Figure 5:
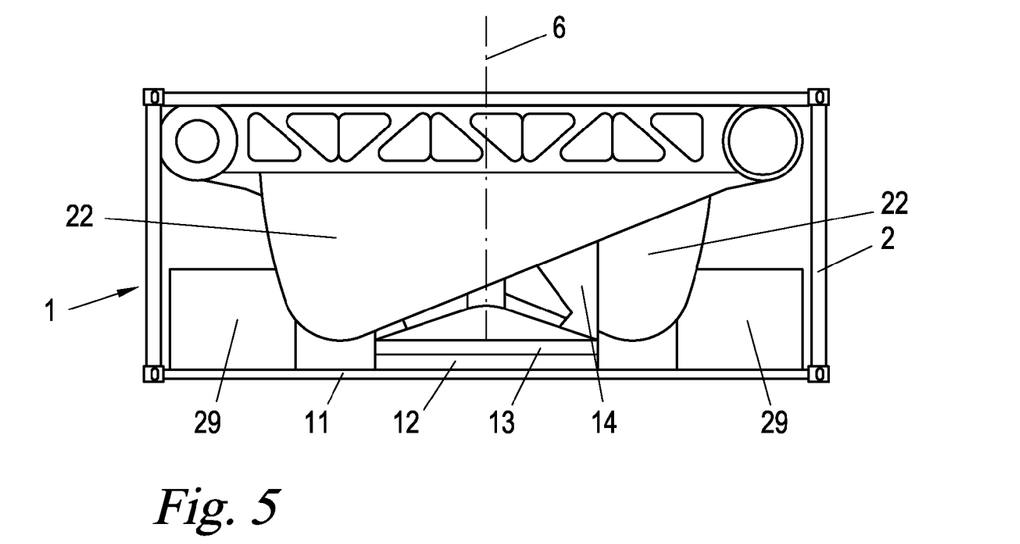
FIGS. 5 to 7 show the solar module of FIGS. 1 to 4 in the folded transport state in a partially broken-open rear view (FIG. 5), a top view (FIG. 6) and a perspective view obliquely from the front (FIG. 7)
Figure 6:
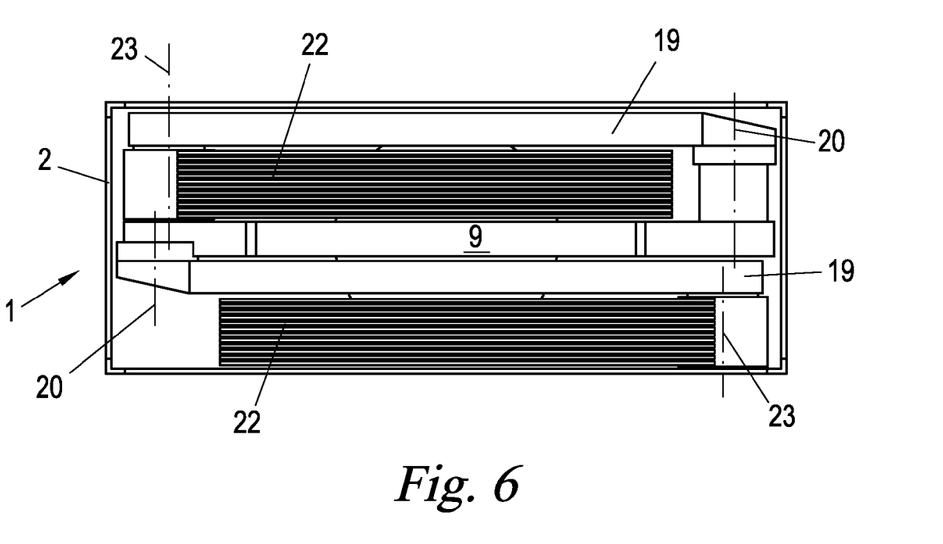
Figure 7:
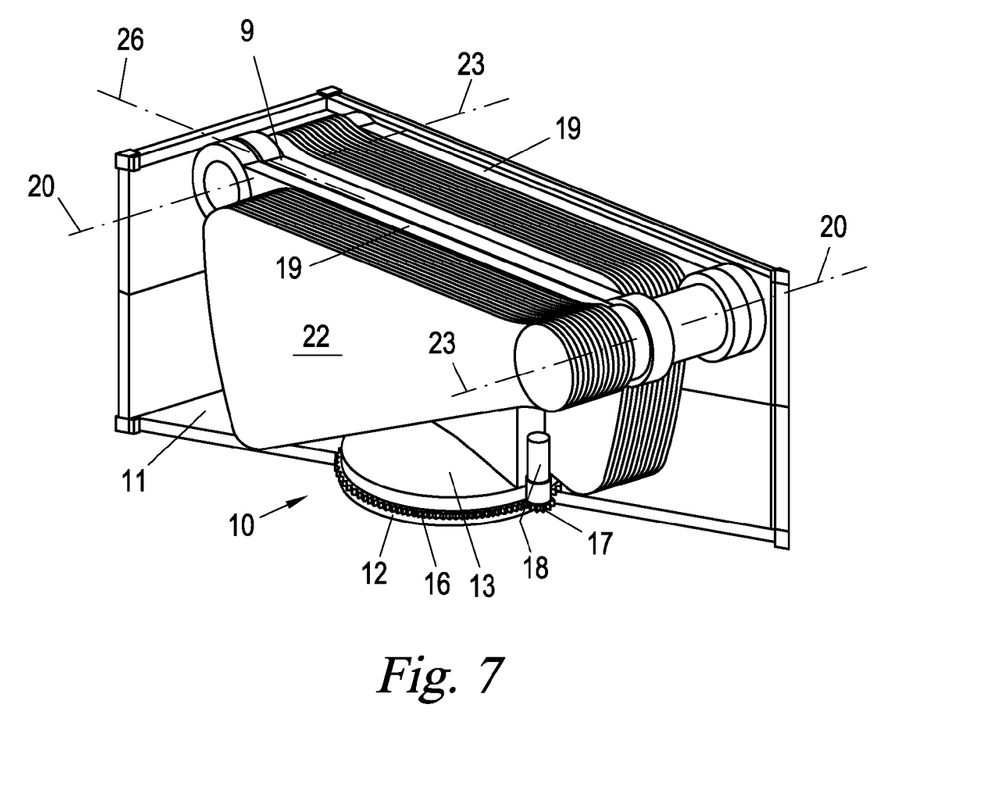

In the "folded" or transport position of the solar module 1 shown in FIGS. 1 and 5 to 7, the housing 2 accommodates a base support 9, which extends approximately horizontally and centrally in the longitudinal extension of the housing 2 and which, by way of a pivot mounting 10, is mounted on the bottom 11 of the housing 2 so as to be rotatable about the axis 6. The pivot mounting 10 can be of any arbitrary type and can be a rotatable mounting, the rigid part 12 of which is connected to the bottom 11 and the rotating part 13 of which supports the base support 9 by way of an intermediate support 14 and thus raises the base support to the height of the upper part 5 of the housing 2 (FIG. 5). The upper part 5 of the housing 2 and the base support 9 can thus be rotated together with respect to the lower part 4 of the housing 2 about the axis 6 (FIG. 4). The rotating part 13 can be equipped with a toothed ring 16, in which a pinion 17 of an electric drive 18 engages so as to rotate the base support 9 and the upper housing part 5, see FIG. 7.

At the two diametrical ends of the base support 9, a respective support 19 is hinged pivotably about an approximately horizontal axis 20 extending normal to the base support 9. The two supports 19 have approximately the same length as the base support 9 and are located approximately parallel to the base support 9 when the solar module 1 is folded (FIGS. 1 and 5 to 7). After the cover side 7 has been opened by pivoting open the flaps 8, the supports 9 can be pivoted out and upward—manually or with the aid of drives, which are not shown in details—through the opening of the cover side 7, see FIGS. 2 to 4. In the completely pivoted-out positions, the two supports 19 preferably assume an obtuse angle relative to the base support 9, in particular approximately 120°. After the supports 19 have been pivoted out, parts of the cover side 7 can be closed again, for example several of the flaps 8 (FIGS. 3, 4).

Each of the two supports 19 carries a plurality of lamellar solar panels 22 at the free end 21, the solar panels on each support 19 being mounted at the end 21 so as to be pivotable or fanned out about a common axis 23. As an option to this, the end 21 can be designed in the form of a pivot head 24 (FIG. 9), so that the axis 23 can be rotated about the longitudinal axis 24 of the support 19 and/or pivoted about an axis 25 that is normal thereto (perpendicularly to the drawing plane of FIG. 9).

Figure 9:
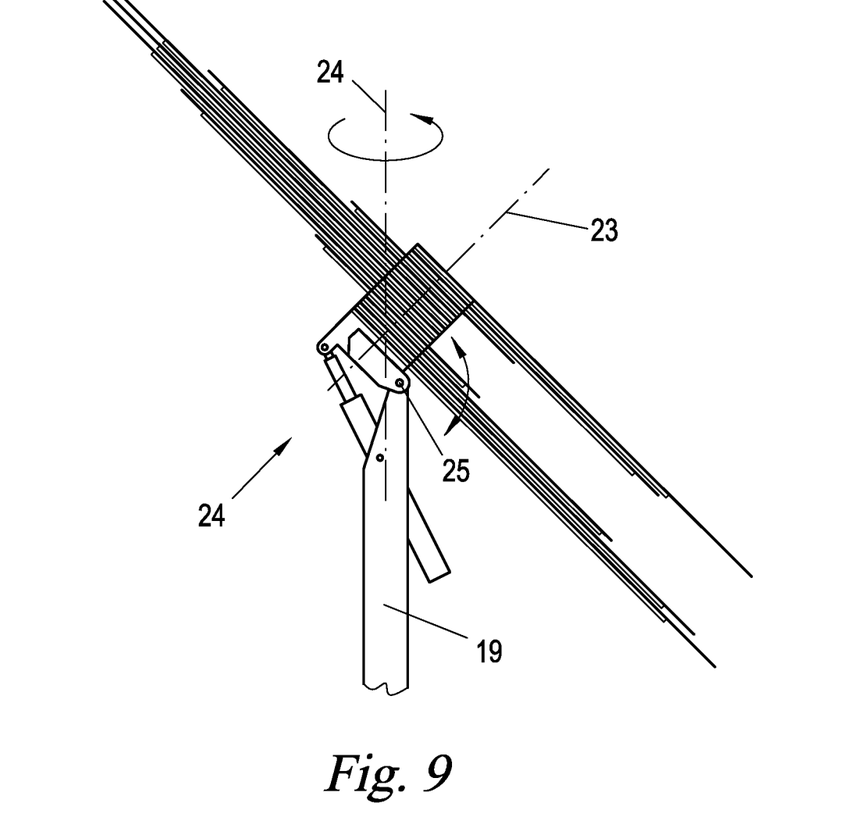
FIG. 9 shows a side view of a pivot head of a solar panel support.

Since the base support 9, together with the two supports 19, can already be rotated about the vertical axis 6, an individual rotation of the axis 23 about the support axis 24 is not absolutely necessary. Pivoting of the axis 23 about the axes 25 is also not absolutely necessary, however this is favorable to achieve optimal orientation of the solar panels 22 toward the position of the sun. As an alternative or in addition, the bearing axis 20 of the two supports 19 can be pivotable about an axis 26 extending in the longitudinal direction of the base support 9, for example by way of ball or universal joints, if so desired. In some cases, the supports 19 are only hinged to the base support 9 about the bearing axis 20 thereof, and the pivot heads 24 are dispensed with or are reduced to the swivel axis 25.

Figures 1, 2:
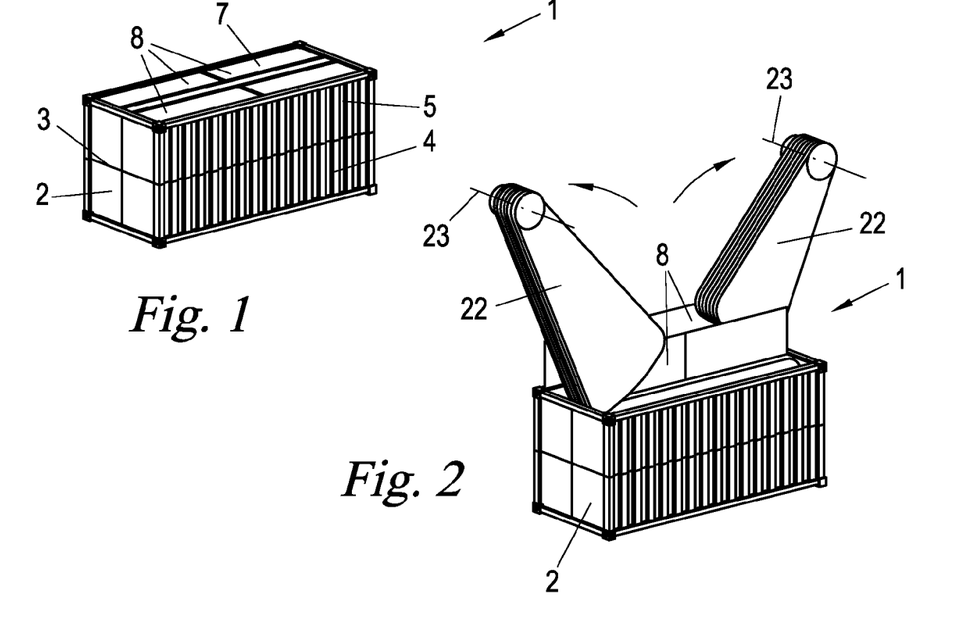
FIGS. 1 to 4 show perspective views of the solar module according to the invention in consecutive phases of extending the supports, fanning out the solar panels and rotating the base support.
Figure 3:
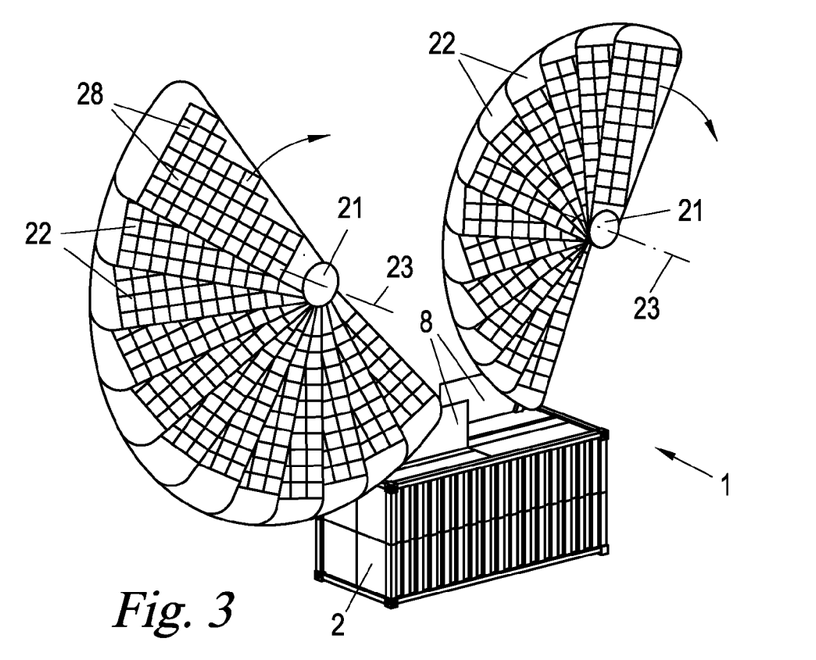

As is apparent from FIGS. 2 to 4, the solar panels 22 of a support 19 can thus be moved about the respective axis 23 thereof from a first position (FIG. 2), in which they are disposed on top of each other substantially congruently and parallel to the support 19, into a second position, in which they can be fanned out about the axis 23 and are thus located substantially next to each other (FIG. 4), and conversely. The solar panels 22 preferably have the shape of sectors of a circle for this purpose, so that together they form a full circle at the end 21 of each support 19 when they are in the fanned-out, second position (FIG. 4).

Before, simultaneously with or after fanning out the solar panels 22 about the axis 23 thereof, the base support 9 can be rotated about the axis 6, wherein the upper housing part 5 also rotates, see FIG. 4. By rotating the base support 9 about the axis 6, the fanned-out solar panels 22 can be optimally oriented toward the position of the sun. This, however, can be enhanced by pivoting the fan axis 23 about the tilt axes 25 and/or rotational axes 24 of the pivot heads 24 and/or the swivel axes 26 of the supports 19, if such pivoting options are provided.

For the described movements, corresponding drives, such as of an electric or hydraulic type (not shown), can be provided. The drives can also be controlled by appropriate sun position sensors for automatic tracking of the solar panels 22 of the position of the sun over the course of the day and year in the aforementioned manner.

In the example shown, each solar panel 22 is formed by a planar array of photovoltaic solar cells 28. The electrical connections or interconnections of the solar cells 28 and solar panels 22 are not shown for the sake of clarity; for example, the solar panels 22 are contacted at the pivot heads 24 or ends 21 by way of flexible connecting cables or sliding contacts and rigid contact rings and connected to the further electrical system.

The electrical system of the solar module 1 is preferably disposed in the lower part 4 of the housing 2, as close to the bottom 11 as possible, so as to keep the center of gravity of the solar module 1 low. For example, the entire space remaining in the lower part 4 of the housing 2 can be utilized to arrange electrical components and rechargeable batteries 29 therein.

So as to increase stability in the completely fanned-out state of the solar module 1 (FIG. 4), the housing 2 can be equipped with extendable, telescoping or folding supports or extension arms 30 to increase the effective footprint thereof.

Figure 8:
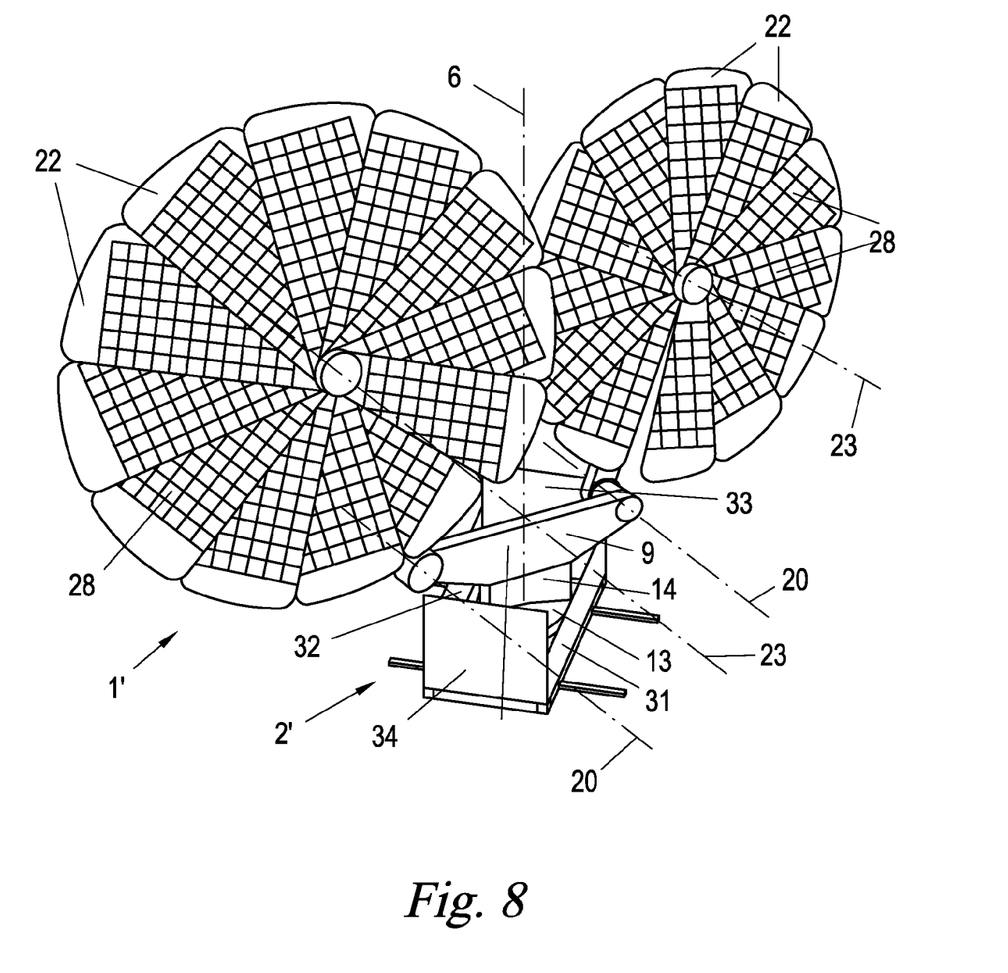
FIG. 8 is an alternative embodiment of the solar panel according to the invention in a representation similar to that of FIG. 4.

FIG. 8 shows an alternative embodiment 1' of the solar module, wherein identical reference numerals denote identical parts as in FIGS. 1 to 7 and hereafter only the differences compared to solar module 1 will be addressed. The solar module 1' of FIG. 8 comprises a slightly modified housing 2', which is not divided into two parts, but has longitudinal sides 31, 32 that can be opened (at least partially) so as to permit the base support 9 to rotate about the axis 6 thereof. Optionally, the narrow sides 33, 34 of the housing 2') can also be openable (at least partially), however this is not absolutely necessary. As is shown in FIG. 8, it is sufficient to remove or fold away the upper regions of the longitudinal sides 31, 32 to permit diametrical pivoting out of the base support 9.

Figure 10:
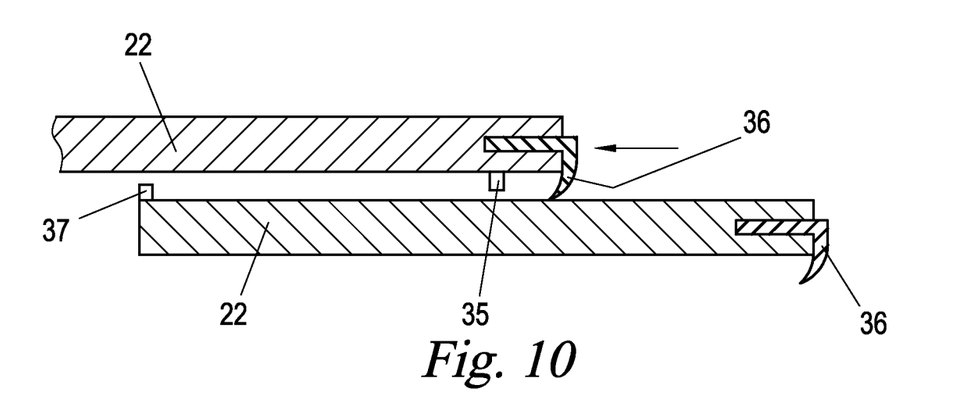
FIG. 10 is a sectional view through two solar panels disposed on top of each other to illustrate the sweeping lip between these.

For fanning out the solar panels 22 about the axes 23, it is sufficient in both variants (FIGS. 1 to 7 and FIG. 8) to drive, for example, only the respective uppermost or lowermost solar panel 22 of a support 19, if each solar panel 22 entrains the solar panel 22 disposed thereabove or therebeneath by way of entrainment hooks or tabs 35 (FIG. 10).

During this entrainment movement, the sliding of the solar panels 22 on top of one another can be used for cleaning of the solar panels 22. For this purpose, according to FIG. 10, each solar panel 22 (with the exception of the lowermost solar panel 22) is equipped at the rear with a sweeping lip 36, which sweeps off the respective solar panel 22 beneath during fanning out. The sweeping lip 36 can be a rubber or brush lip, for example.

The sweeping lip 36 can form the entrainment tab 35 at the same time. The entrainment tab 35 strikes against a stop strip 37 at the end of the movement of the tab over the solar panel 22 located beneath.

Additional sweeping lips can be disposed in the housing 2, 2' for the respective uppermost solar panel 22 of each support 19, the lips sweeping off the uppermost solar panel 22, for example when the support 19 is pivoted into and out of the housing 2, 2'.

In one exemplary embodiment of the solar module 1, 1' comprising a housing 2, 2' having the dimensions of a standardized 20-foot ISO container and a weight of approximately 20 to 25 tons, the solar panels 22 reach a surface of approximately 2×70 m² when they are completely fanned out (FIGS. 4, 8) and can generate power of up to 50 kW.

The invention is not limited to the shown embodiment, but encompasses all variants and modifications that are covered by the scope of the accompanying claims.

What is claimed is:

1. A solar module comprising:
at least a plurality of lamellar solar panels which are mounted pivotably, about a common axis, on an elongate support and can be moved between a first position, in which they are disposed over each other substantially congruently and parallel to the support, and a second position, in which they lie substantially next to each other in a fanned out manner about the common axis, wherein in the first and second positions the solar panels are parallel to each other and the solar panels remain parallel to each other during fanning out from the first position to the second position,
wherein the support is pivotable out of a housing which accommodates the support together with the solar panels in the first position of the panels,
wherein the solar module comprises two supports of the aforementioned type equipped with solar panels in the aforementioned manner, and
wherein the two supports are pivotably hinged at the diametrical longitudinal ends of an elongate base support, such that each support can pivot about an axis approximately extending normal to a side of the base support on which it is mounted, the base support being mounted rotatably, about an approximately vertical axis, in the housing.

2. The solar module according to claim 1, wherein each support is located approximately parallel to the base support when in a pivoted-in position, and at an obtuse angle relative to the base support when in a pivoted-out position.

3. The solar module according to claim 2, wherein the two supports are located symmetrically with respect to the vertical axis in the pivoted-in position.

4. The solar module according to claim 1, wherein the housing has the shape of an elongate box having a cover side that can be opened and at least two longitudinal sides that can be opened, which when open permit the base support to be rotated with respect to the remaining housing.

5. The solar module according to claim 1, wherein the housing has the shape of an elongate box and is divided into a lower part and an upper part, wherein the lower part accommodates a pivot mounting for the base support and the upper part accommodates the base support, so as to permit the upper part and the base support to be rotated jointly with respect to the lower part.

6. The solar module according to claim 1, wherein a lower part of the housing includes at least one electric accumulator for power generated by the solar panels.

7. The solar module according to claim 1, wherein the housing is a land, sea or air freight container.

8. The solar module according to claim 7, wherein the container is a swap body.

9. The solar module according to claim 1, wherein at least one solar panel is equipped at the rear with a sweeping lip which slides along the solar panel located beneath during fanning out.

10. The solar module according to claim 1, wherein each support comprises a pivot head at one end for mounting the solar panels.

11. The solar module according to claim 1, wherein at least one of the base support and the two supports is equipped with a drive controlled depending on the position of the sun for automatic solar tracking of the solar panels.

12. The solar module according to claim 1, wherein each solar panel is formed by a planar array of photovoltaic solar cells.

13. The solar module according to claim 2, wherein said obtuse angle is approximately 120°.

14. The solar module according to claim 5, wherein the lower part of the housing includes at least one electric accumulator for power generated by the solar panels.

15. The solar module according to claim 10, wherein each of the pivot heads is equipped with a drive controlled depending on the position of the sun for automatic solar tracking of the solar panels.

16. A solar module comprising:
a housing;
a base support pivotally mounted in the housing to rotate about a substantially vertical axis;
two solar panel mounting arms, each mounting arm being pivotally hinged at opposite ends of the base support about a substantially horizontal axis extending normal to the base support; and
a plurality of solar panels mounted pivotally about only a common axis on each of the mounting arms, the solar panels being movable between a first folded position so that the solar panels lie stacked together and a second open position in which the solar panels are fanned out about the common axis;
wherein the mounting arms are pivotable out of the housing so that the solar panels are movable to the second open position, the housing accommodating the mounting arms and solar panels in the first folded position.

17. The solar module according to claim 16, wherein each mounting arm is located approximately parallel to the base support when in a pivoted-in position, and at an obtuse angle relative to the base support when in a pivoted-out position.

18. The solar module according to claim 17, wherein the two mounting arms are located symmetrically with respect to the rotational vertical axis in the pivoted-in position.

19. The solar module according to claim 16, wherein the housing has the shape of an elongate box having a cover side that can be opened and at least two longitudinal sides that can be opened, which when open permit the base support to be rotated with respect to the remaining housing.

20. The solar module according to claim 16, wherein the housing has the shape of an elongate box and is divided into a lower part and an upper part, wherein the lower part accommodates the pivot mounting for the base support and the upper part accommodates the base support, so as to permit the upper part and the base support to be rotated jointly with respect to the lower part.

21. The solar module according to claim 16, wherein at least one of the base support and the two mounting arms is equipped with a drive controlled depending on the position of the sun for automatic solar tracking of the solar panels.

22. A solar module comprising:
a housing;
a base support pivotally mounted in the housing to rotate about a substantially vertical axis;
two solar panel mounting arms, each mounting arm being pivotally hinged at opposite ends of the base support about a substantially horizontal axis extending normal to the base support; and
a plurality of solar panels mounted pivotally about a common axis on each of the mounting arms, the solar panels being movable between a first folded position so that the solar panels lie stacked together and a second open position in which the solar panels are fanned out about the common axis;
wherein the mounting arms are pivotable out of the housing, the housing accommodating the mounting arms and solar panels in the first folded position; and
wherein the housing has the shape of an elongate box and is divided into a lower part and an upper part, wherein the lower part accommodates the pivot mounting for the base support and the upper part accommodates the base support, so as to permit the upper part and the base support to be rotated jointly with respect to the lower part.

23. The solar module according to claim 22, wherein each mounting arm is located approximately parallel to the base support when in a pivoted-in position, and at an obtuse angle relative to the base support when in a pivoted-out position.

24. The solar module according to claim 23, wherein the two mounting arms are located symmetrically with respect to the rotational vertical axis in the pivoted-in position.

25. The solar module according to claim 22, wherein the housing has the shape of an elongate box having a cover side that can be opened and at least two longitudinal sides that can be opened, which when open permit the base support to be rotated with respect to the remaining housing.

26. The solar module according to claim 22, wherein the housing has the shape of an elongate box and is divided into a lower part and an upper part, wherein the lower part accommodates the pivot mounting for the base support and the upper part accommodates the base support, so as to permit the upper part and the base support to be rotated jointly with respect to the lower part.

* * * * *